United States Patent [19]

Yamato

[11] Patent Number: 4,918,852
[45] Date of Patent: Apr. 24, 1990

[54] FIXTURE FOR A FISHING REEL

[75] Inventor: Yoshiro Yamato, Sakai, Japan

[73] Assignee: Shimano Industrial Company Limited, Osaka, Japan

[21] Appl. No.: 367,679

[22] Filed: Jun. 19, 1989

[30] Foreign Application Priority Data

Jun. 21, 1988 [JP] Japan ............................ 63-82135[U]

[51] Int. Cl.$^5$ ............................................ A01K 87/06
[52] U.S. Cl. .......................................... 43/22; 43/23; 43/25
[58] Field of Search ................. 43/18.1, 18.5, 20, 22, 43/23, 25, 21.2

[56] References Cited

U.S. PATENT DOCUMENTS

| | | | |
|---|---|---|---|
| 4,237,640 | 12/1980 | Sato | 43/22 |
| 4,554,755 | 11/1985 | Hsu | 43/22 |
| 4,726,139 | 2/1988 | Tukuda | 43/22 |
| 4,756,114 | 7/1988 | Ohmura | 43/22 |
| 4,821,447 | 4/1989 | Nakayama et al. | 43/22 |
| 4,839,981 | 6/1989 | Yasui | 43/22 |

Primary Examiner—Nicholas P. Godici
Assistant Examiner—Mike Starkweather
Attorney, Agent, or Firm—Stevens, Davis, Miller & Mosher

[57] ABSTRACT

A fixture for a fishing reel is provided which includes a tubular fixture body having a screw thread, a fixing holder, a movable pusher movable toward or away from the fixing holder, and a threaded ring for operating the movable pusher. A plurality of locking grooves extending lengthwise of the fixture body are provided at the screw thread of the fixture body. These locking grooves are spaced at predetermined intervals circumferentially of the fixture body. An engaging projection engageable with one of the locking grooves to restrain the threaded ring from loosening is provided at the threaded ring such that it can be changed in position between engaged and disengaged positions with one of the locking grooves.

4 Claims, 3 Drawing Sheets

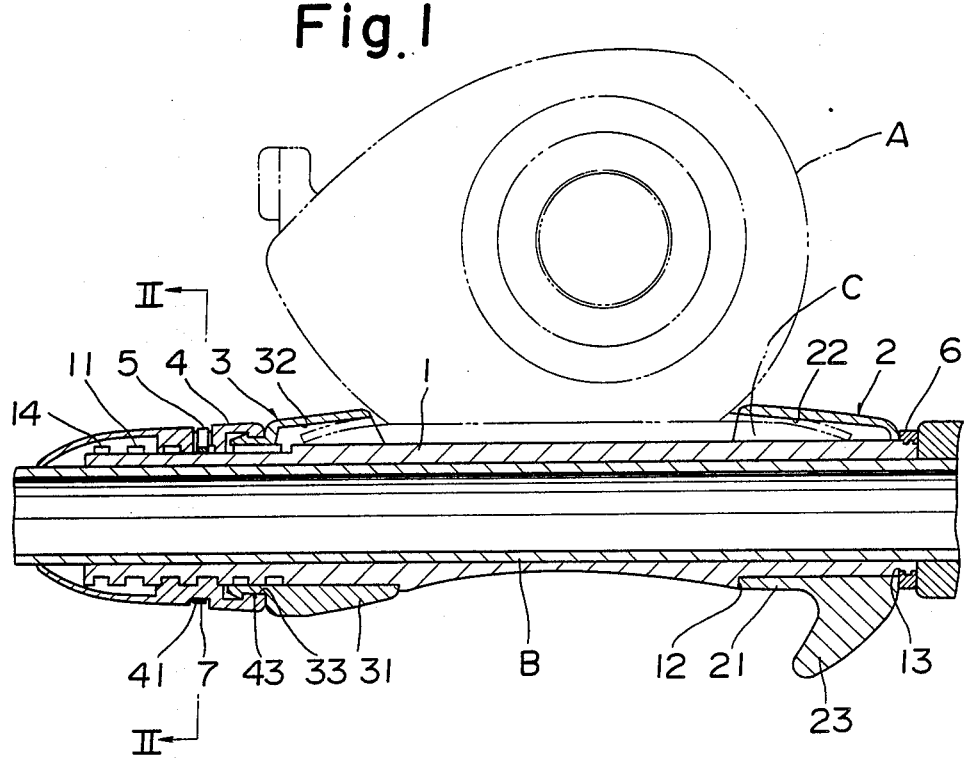
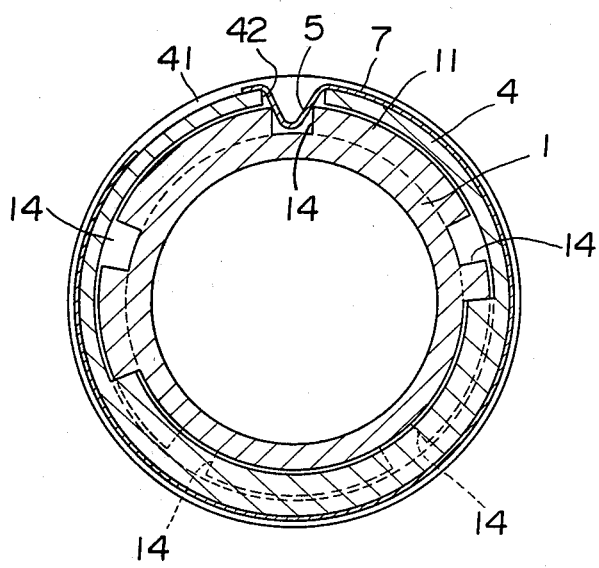
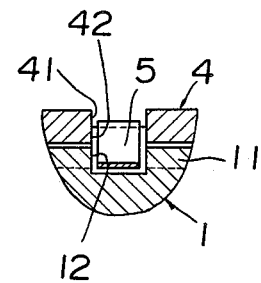

FIXTURE FOR A FISHING REEL

FIELD OF THE INVENTION

The present invention relates to a fixture for a fishing reel, and more particularly, to a fixture for a fishing reel fixed to the butt of a fishing rod and for mounting a fishing reel thereof.

BACKGROUND OF THE INVENTION

Generally, fishing reel fixtures are constructed such that a cylindrical body of the fixture is mounted on the outer periphery of the butt of the fishing rod. This cylindrical body is provided at the outer periphery of one lengthwise side of a fixture body thereof with a screw thread, and a fixing holder is fixed to the other lengthwise side of the fixture body. A movable pusher movable toward or away from the fixing holder is supported at one lengthwise side of the same, and a threaded ring for operating the movable pusher screws with the screw thread.

The fishing reel is mounted to the fishing rod through the fixture such that a mounting leg of the fishing reel is interposed between the fixing holder and the movable pusher. The threaded ring screws forwardly to move the movable pusher toward the fixing holder, and the mounting leg is fixed between the fixing holder and the movable pusher.

Conventionally, the threaded ring screws rearwardly to move the movable pusher away from the fixing holder so that the mounting leg is released and removed from between both members.

In conventional fishing rod fixtures, the threaded ring screwably fixing the mounting leg may become loose when it is subjected to vibrations or the like, thereby creating a problem in that the reel may cause a backlash or may fall out of engagement from the fishing rod.

SUMMARY OF THE INVENTION

An object of the invention is to provide a fixture for a fishing reel, which is capable of preventing the threaded ring from carelessly loosening and also of enabling easy removal of the fishing reel from the fishing rod.

The present invention is characterized in that a fixture for a fishing reel comprises (1) a tubular fixture body having a screw thread at the outer periphery of one lengthwise side of the fixture, (2) a fixing holder fixed to the other lengthwise side of the fixture body, (3) a movable pusher positioned at and supported to one lengthwise side of the fixture body such that it is movable toward or away from the fixing holder, and (4) a threaded ring screwable with the screw thread to operate the movable pusher. The screw thread is provided with a plurality of locking grooves extending lengthwise of the fixture body and disposed circumferentially thereof. The threaded ring is provided with at least one engaging projection engageable with each locking groove to restrain the threaded ring from loosening, and the engaging projection is changeable in position between an engagement position with the locking groove and a disengagement position therefrom.

Accordingly, the threaded ring screws forwardly to urge the movable pusher so that the movable pusher and fixing holder can mount therebetween the mounting leg of the fishing reel. The engaging projection engages at the screwably tightening termination thereof with the locking groove, thereby reliably preventing the threaded ring from loosening, and eliminating a backlash caused at the fishing reel when mounted.

Also, since the engaging projection is changed in its disengaging position thereof from the locking groove, when the fishing reel is removed, the threaded ring can be easily screwed backwardly to thereby facilitate removal of the reel.

The above and further objects and novel features of the invention will be more fully apparent from the following detailed description when read in connection with the accompanying drawings.

BRIEF DESCRIPTION OF THE DRAWINGS

FIG. 1 is a longitudinal sectional view of a first embodiment of a fixture for a fishing reel of the invention, FIG. 2 is an enlarged sectional view taken on line II—II in FIG. 1, FIG. 3 is an enlarged sectional view of the principal portion of the FIG. 1 embodiment.

DETAILED DESCRIPTION OF THE INVENTION

Figure 4:
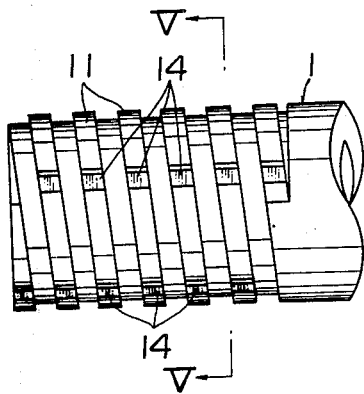
FIG. 4 is a partially omitted front view of a fixture body only.
Figure 5:
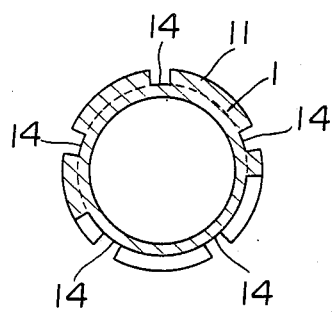
FIG. 5 is a sectional view taken on line V—V in FIG. 4.

Referring to FIG. 1, a fishing reel A is mounted on the outer periphery of a fishing rod B and provided with a mounting leg C.

A fixture for the fishing reel of the present invention is used for mounting fishing reel A to fishing rod B and, as shown in FIG. 1, comprises a tubular fixture body 1 to be fitted and fixed onto the outer periphery of fishing rod B, a fixing holder 2 fixed to the right side at the outer periphery of fixture body 1, a movable pusher 3 supported at the left side of fixture body 1 so as to be movable toward or away from fixing holder 2, and a threaded ring 4 for operating movable pusher 3. At the outer periphery of the left end of fixture body 1 is provided a screw thread 11 screwable with threaded ring 4, and at the outer periphery of the right end of fixture body 1 are provided a shoulder 12 for receiving fixing holder 2 and a short screw thread screwed with a lock nut 6 for fixing holder 2.

Fixing holder 2 and movable pusher 3 are provided with tubular portions 21 and 31 to be fitted onto the outer periphery of fixture body 1 respectively. Tubular fitting portions 21 and 31 are provided at one of their sides with recessed sockets 22 and 32 which are open opposite to each other.

In addition, in a first embodiment of the fixture shown in FIG. 1, a finger plate 23 is integral with fixing holder 2 and positioned at one circumferential side thereof, that is, at a side thereof opposite to the side at which recessed socket 22 is positioned.

Figure 6:
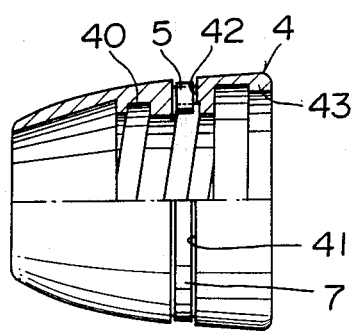
FIG. 6 is a partially cutaway front view of a threaded ring only.

Threaded ring 4, as shown in FIG. 6, is provided at its inner surface with a thread groove 40 screwable with screw thread 11. Annular engaging portion 43 projects radially inwardly at the right-side end of ring 4 as shown in FIG. 6 and is rotatably fitted into an annular groove 33 provided at the left side outer periphery of movable pusher 3 as shown in FIG. 1, thereby connecting threaded ring 4 and movable pusher 3 in an associating manner.

In the first embodiment shown in FIGS. 1 through 6, at a thread ridge of screw thread 11 of fixture body 1 are provided a plurality of circumferentially disposed locking grooves 14 extending lengthwise of fixture body 1 and spaced at regular intervals. An annular groove 41 is provided at the outer periphery of threaded ring 4 near the position thereof at which thread groove 40 is formed. A window 42 is formed through annular groove 41 radially inwardly as shown in FIGS. 2, 3 and 6. A substantially C-shaped rotary operating ring 7 in the form of a steel spring is rotatably held to annular groove 41. An engaging projection 5 enters into threaded ring 4 through window 42 and engages with locking groove 14 to thereby restrain threaded ring 4 from becoming loose. Engaging projection 5 is provided at one end of operating ring 7 to be changeable in position of locking groove 14.

In the above-described construction, locking grooves 14 may alternatively be inclined with respect to the axis of fixture body 1. Also, the number of locking groove 14 is not particularly limited, but preferably three or five locking grooves are provided.

Engaging projection 5 integral with one end of operating ring 7 is adapted to be changed in position between engagement and disengagement positions with respect to locking groove 14 by rotating and elastically deforming operating ring 7. In other words, when threaded ring 4 is screwed forwardly, engaging projection 5 is allowed to enter into window 42 so that a joint between operating ring 7 and engaging projection 5 is elastically deformed in the interplay between the engaging resistance of projection 5 with respect to locking groove 14 and the rotational force of threaded ring 4, thereby forwardly screwing threaded ring 4 while projecting or retracting engaging projection 5 in window 42. When threaded ring 4 screws rearwardly, operating ring 7 is rotated with respect to threaded ring 4 and engaging projection 5 rides on annular groove 41 from the position of window 42 so as not to engage with locking groove 14.

The fixture for the fishing reel of the present invention constructed as described above mounts fishing reel A to the reel fixture such that mounting leg C is interposed between fixing holder 2 and movable pusher 3 and then threaded ring 4 is rotated. Then, the rotary operating force of threaded ring 4 overcomes the engaging resistance of engaging projection 5 relative to locking groove 14, whereby the joint between operating ring 7 and engaging projection 5 is elastically deformed and engaging projection 5 disengages from locking groove 14, thus enabling threaded ring 4 to be screwed forwardly.

In this case, it is repeated that engaging projection 5 rides on the outer periphery of screw thread 11, engages with locking groove 14, disengages therefrom, and rides on screw thread 11. When engaging projection 5 engages with locking groove 14, an elastic restoring force of operating ring 7 allows engaging projection 5 to fall into locking groove 14 so as to generate a sound and yield a clicking feeling. Thus, upon ending screwable tightening of threaded ring 4, fishing reel A is positioned at mounting leg C between fixing holder 2 and movable pusher 3 so as to be fixed therebetween.

Thus, engaging projection 5 engages with locking groove 14 at the operating position of threaded ring 4, thereby enabling threaded ring 4 to be reliably prevented from becoming loose. In this case, if locking groove 14 is not coincident with engaging projection 5, threaded ring 4 is rotated in the loosening direction, but an axial movement of threaded ring 4 is very small with respect to the amount of rotation thereof, so that engaging projection 5 immediately engages with locking groove 14 due to a small amount of unscrewing action, thereby reliably preventing further loosening of threaded ring 4. Also, when reel A is dismounted, operating ring 7 is rotated clockwise in FIG. 2 with respect to threaded ring 4 and engaging projection 5 disengages from window 42 and also from locking groove 14, thereby riding on annular groove 41. Hence, engaging projection 5 is held in the disengaging position with respect to locking groove 14, so that the position-holding can be lightly and freely screwed backwardly without affecting locking groove 14.

Figure 7:
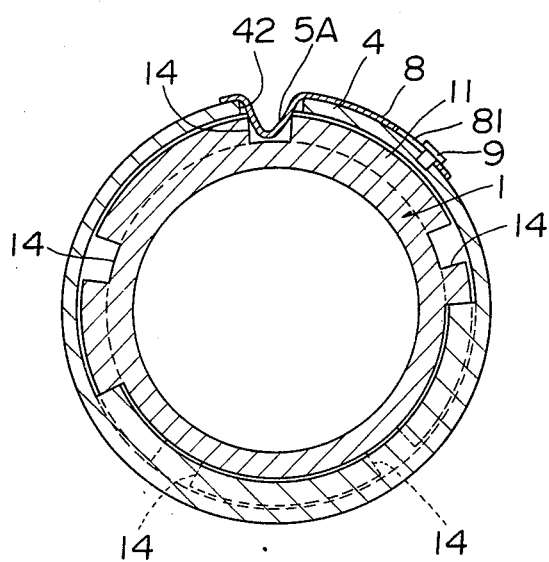
FIG. 7 is an enlarged sectional view of a second embodiment, corresponding to FIG. 2.

Alternatively, as shown in FIG. 7, at the outer periphery of threaded ring 4 there may be mounted through a mounting stem 9 an elastic band-like plate 8 formed of an elastic member, and an engaging projection 5A may be formed at plate 8. In this embodiment, preferably an elongate slot 81 is provided at plate 8 and stem 9 is fitted into slot 81 so that plate 8 is mounted movably with respect to threaded ring 4. Thus, the specific construction of the operating ring is not particularly limited to the illustrate structure.

Also, the fixture body may alternatively be integral with the fishing rod.

As seen from the above, the present invention provides the advantage of preventing threaded ring 4 from becoming loose. The invention includes a plurality of locking grooves 14 provided at screw thread 11 at fixture body 1 and an engaging projection 5, which is engageable with locking groove 14 so as to restrain threaded ring 4 from becoming loose, is provided at threaded ring 4 so as to be changeable in position. Hence, the fixture of the invention has a simple construction and is inexpensive to produce and convenient to use due to the construction enabling engaging projection 5 to be changed in position.

Although several embodiments have been described above, they are merely illustrative of the invention and not to be construed as limiting, the invention being defined solely by the appended claims.

I claim:

1. A fixture for a fishing reel, comprising:
a tubular fixture body having a screw thread disposed at an outer periphery of one lengthwise end thereof;
a fixing holder fixed to another lengthwise end of said fixture body;
a movable pusher positioned at one side of said fixture body and supported to said fixture body to be movable toward or away from said fixing holder; and
a threaded ring screwable with said screw thread to operate said movable pusher to undergo movement toward or away from said fixing holder, said screw thread being provided with a plurality of locking grooves each extending lengthwise of said fixture body, said plurality of locking grooves being spaced apart circumferentially around said fixture body, said threaded ring being provided with at least one engaging projection selectively engageable one at a time with said plurality of locking grooves to restrain said threaded ring from loosening relative to said movable pusher, said engaging projection being changeable in position between an engaging position where said engaging projection engages with one of said locking grooves and a disengaging position where said engaging projection disengages from one of said locking grooves.

2. A fixture for a fishing reel according to claim 1, wherein said threaded ring includes an annular groove at its outer periphery and an operating ring rotatably supported relative to said annular groove, said engaging projection is provided at said operated ring, and a window is provided at said threaded ring, whereby rotation of said operating ring relative to said annular groove of said threaded ring causes said engaging projection alternatively (i) to enter into said window to be held at said engaging position where said engaging projection engages with one of said locking grooves and (ii) to leave said window at said disengaging position of said engaging projection relative to said locking groove to ride on said annular groove so as to not be engaged with one of said locking grooves.

3. A fixture for a fishing reel according to claim 1, wherein a band-like plate is provided with said engaging projection and is mounted to said threaded ring, said threaded ring being provided with a window, said engaging projection extending through said window to engage with one of said locking grooves.

4. A fixture for a fishing reel according to claim 3, wherein said band-like plate is movable with respect to said threaded ring whereby said band-like plate is movable operable to hold said engaging projection in said engaging position where said engaging projection extends through said window to engage with said locking groove and said disengaging position where said engaging projection leaves said window to ride on an outer periphery of said threaded ring so as to not be engaged with one of said locking grooves.

* * * * *